(12) United States Patent
Larouche et al.

(10) Patent No.: US 9,216,802 B2
(45) Date of Patent: Dec. 22, 2015

(54) SAFETY FLAG FOR A WATERCRAFT (75) Inventors: Annie Larouche, Mascouche (CA); Georges Bassily, Laval (CA)

(73) Assignee: PELICAN INTERNATIONAL INC., Laval, Quebec (CA)

(*) Notice: Subject to any disclaimer, the term of this patent is extended or adjusted under 35 U.S.C. 154(b) by 1040 days.

(21) Appl. No.: 13/273,750

(22) Filed: Oct. 14, 2011

(65) Prior Publication Data

US 2013/0092074 A1    Apr. 18, 2013

(51) Int. Cl.
*B63B 45/04* (2006.01)
*G09F 17/00* (2006.01)
*B63B 35/85* (2006.01)
*F16B 9/02* (2006.01)

(52) U.S. Cl.
CPC ............... *B63B 45/04* (2013.01); *B63B 35/85* (2013.01); *F16B 9/02* (2013.01); *G09F 17/00* (2013.01); *Y10T 403/7039* (2015.01)

(58) Field of Classification Search
CPC ......... B63B 45/04; B63B 35/85; G09F 17/00; F16B 9/02; F16B 9/023; F16B 9/026; Y10T 403/7039
USPC ....... 116/28 R, 209, 173–174, 26; 248/181.1, 248/181.2, 288.31, 539; 40/591–592; 403/277–282, 259
See application file for complete search history.

(56) References Cited

U.S. PATENT DOCUMENTS

| | | | | |
|---|---|---|---|---|
| D31,579 S | * | 10/1899 | Todd | D19/54 |
| 1,266,770 A | * | 5/1918 | Burton | 248/540 |
| 1,888,338 A | * | 11/1932 | Weatherhead, Jr. | 285/288.1 |
| 2,277,981 A | * | 3/1942 | Horton | 40/556 |
| 2,476,407 A | * | 7/1949 | Eriksen et al. | 174/158 R |
| 2,655,963 A | * | 10/1953 | Dell | 81/492 |
| 2,720,374 A | * | 10/1955 | Hutton | 267/141.4 |
| 2,755,056 A | * | 7/1956 | Hutton | 267/141.7 |
| 2,904,358 A | * | 9/1959 | Ramon | 403/259 |
| 3,056,852 A | * | 10/1962 | Sachs | 174/153 G |
| 3,104,644 A | * | 9/1963 | Burton | 116/209 |
| 4,519,153 A | * | 5/1985 | Moon et al. | 40/591 |
| 4,632,354 A | | 12/1986 | Asciutto | |
| 4,675,937 A | * | 6/1987 | Mitomi | 16/2.1 |
| 4,729,690 A | * | 3/1988 | Lavender et al. | 404/10 |

(Continued)

FOREIGN PATENT DOCUMENTS

GB    2207216 A  *  1/1989   ............ F16D 1/06

OTHER PUBLICATIONS

Water Walker Sea Kayaks, "Rispy Kayak Safety Flag", http://www.touringkayaks.com/gear.htm, accessed Nov. 16, 2011, 2 pages.

*Primary Examiner* — R. A. Smith
*Assistant Examiner* — Tania Courson
(74) *Attorney, Agent, or Firm* — Baker & Hostetler LLP (57) ABSTRACT

The present invention provides a safety flag for a watercraft that comprises an elongated pole, a pennant flag and a connector having upper, intermediate and bottom portions. The upper portion of the connector has an aperture for receiving the bottom portion of the pole. The intermediate portion of the connector has a shoulder for abutting against the upper surface of the wall. The bottom portion of the connector is at least partially made of a flexible elastomeric material such that, in use, a user can insert the bottom portion in a watercraft aperture by rotating or pressing the connector up to a position wherein the shoulder abuts a watercraft wall and the safety flag is maintained in a stand up position.

29 Claims, 10 Drawing Sheets

(56) References Cited

U.S. PATENT DOCUMENTS

| | | | |
|---|---|---|---|
| 4,941,232 A * | 7/1990 | Decker et al. | 16/421 |
| 4,947,713 A * | 8/1990 | Arnold | 81/121.1 |
| 4,988,065 A * | 1/1991 | Leban et al. | 248/181.1 |
| 5,052,327 A * | 10/1991 | Comfort | 116/26 |
| 5,186,119 A * | 2/1993 | Hlavin | 116/222 |
| 5,233,938 A * | 8/1993 | Lalo | 116/173 |
| D360,820 S * | 8/1995 | Haase | D8/356 |
| 5,439,311 A * | 8/1995 | Hughes, Jr. | 404/10 |
| 5,463,974 A * | 11/1995 | Seeder | 116/173 |
| D365,261 S * | 12/1995 | Munro | D8/40 |
| 5,564,665 A * | 10/1996 | Resnick | 248/519 |
| 5,671,480 A | 9/1997 | Krout et al. | |
| 6,000,875 A * | 12/1999 | Staniszewski | 403/370 |
| 6,012,868 A * | 1/2000 | Aoki | 403/326 |
| 6,057,787 A | 5/2000 | Kell et al. | |
| D427,108 S * | 6/2000 | Fisher et al. | D11/182 |
| 6,101,674 A * | 8/2000 | Furuya et al. | 16/2.1 |
| 6,106,912 A * | 8/2000 | Balog | 428/31 |
| 6,119,305 A * | 9/2000 | Loveall et al. | 16/2.2 |
| 6,142,882 A * | 11/2000 | Anglea | 473/150 |
| 6,220,910 B1 | 4/2001 | Richey | |
| 6,345,722 B1 * | 2/2002 | Wingate | 211/70.2 |
| 6,536,369 B1 * | 3/2003 | Bent et al. | 116/63 P |
| 6,675,439 B2 * | 1/2004 | Hashimoto | 16/2.1 |
| 6,808,098 B1 * | 10/2004 | Bickett et al. | 224/512 |
| 6,837,812 B2 * | 1/2005 | Falone et al. | 473/568 |
| D513,967 S * | 1/2006 | Terrill et al. | D8/356 |
| 7,004,103 B2 * | 2/2006 | Chen | 116/28 R |
| 7,017,511 B2 * | 3/2006 | Fisher et al. | 116/173 |
| 7,147,399 B2 * | 12/2006 | Viscount et al. | 403/349 |
| 7,367,700 B2 | 5/2008 | Chasmar | |
| 7,500,919 B2 * | 3/2009 | Priegel | 473/176 |
| 7,594,478 B2 * | 9/2009 | Karnes et al. | 116/28 R |
| 7,661,215 B2 * | 2/2010 | Okamoto | 40/620 |
| 8,089,002 B2 * | 1/2012 | Hasegawa | 174/153 G |
| 8,162,709 B2 * | 4/2012 | Boyer et al. | 440/102 |
| 8,177,185 B2 * | 5/2012 | Priegel | 248/539 |
| 8,502,079 B2 * | 8/2013 | Shitamichi | 174/152 G |
| 8,505,975 B2 * | 8/2013 | Karlof et al. | 280/824 |
| 8,622,853 B1 * | 1/2014 | Roland | 473/398 |
| 8,757,665 B2 * | 6/2014 | Drapes et al. | 280/809 |
| 2008/0155872 A1 * | 7/2008 | Brengman | 40/592 |
| 2010/0024738 A1 * | 2/2010 | Chen et al. | 119/72 |
| 2010/0075782 A1 * | 3/2010 | Stiles | 473/386 |
| 2010/0116192 A1 * | 5/2010 | Avery et al. | 116/173 |

* cited by examiner

SAFETY FLAG FOR A WATERCRAFT

FIELD OF THE INVENTION

The present invention relates to a safety flag for a watercraft.

BACKGROUND OF THE INVENTION

Safety flags are generally used for small watercrafts such as kayaks in order to increase their visibility in any type of water conditions. Due to the fact that the flag significantly protrudes away from the watercraft, it is desirable to have a flag that is easily removed and attached so as to facilitate storing the watercraft when not in use as well as affixing the flag to the watercraft when needed. Some flag-mast assemblies can be attached and removed from the watercraft via screws or bolts, thus requiring the use of tools. This can present an inconvenience if the tools are not readily available in which case the user may attempt to secure the flag onto the watercraft by hand. This would reduce the quality of the attachment and increase the likelihood that the flag gets disconnected. Consequently, there is a need in the industry for a safety flag that can be easily and securely attached to a watercraft without the use of tools.

SUMMARY OF THE INVENTION

According to a first aspect, the present invention provides a safety flag for a watercraft. The watercraft has a portion with a wall having upper and bottom surfaces and an aperture defined in the wall. The safety flag extends along a longitudinal axis and comprises an elongated pole, a pennant flag and a connector. The elongated pole has upper, intermediate and bottom portions extending along the longitudinal axis. The pennant flag is mounted to the upper portion of the elongated pole. The connector has upper, intermediate and bottom portions extending along the longitudinal axis. The upper portion of the connector has an aperture extending along the longitudinal axis for receiving the bottom portion of the pole. The intermediate portion of the connector has a shoulder for abutting against the upper surface of wall. The bottom portion of the connector is at least partially made of a flexible elastomeric material such that, in use, a user can insert the bottom portion in the aperture of the wall by rotating or pressing the connector up to a position wherein the shoulder abuts the upper surface of the wall and the safety flag is maintained in a stand up position.

This and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of embodiments of the present invention is provided hereinbelow with reference to the following drawings, in which.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS OF THE INVENTION

To facilitate the description, any reference numeral designating an element in one figure will designate the same element if used in any other figures. In describing the embodiments, specific terminology is resorted to for the sake of clarity but the invention is not intended to be limited to the specific terms so selected, and it is understood that each specific term comprises all equivalents.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure. Similarly, the terms "inwardly," "outwardly" and "radially" generally refer to the orientation of a surface relative to its axis of elongation, or axis of rotation, as appropriate.

Figure 1:
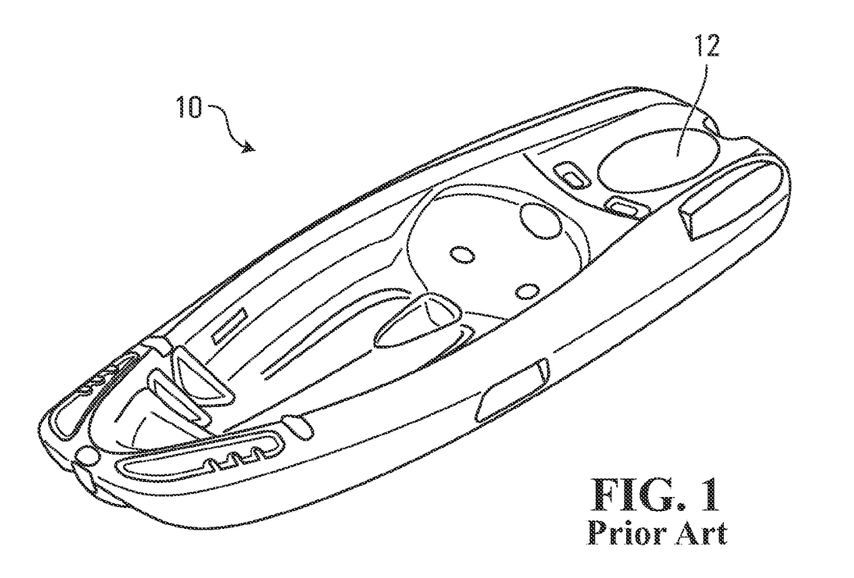
FIG. 1 is a perspective view of a watercraft.
Figure 2:
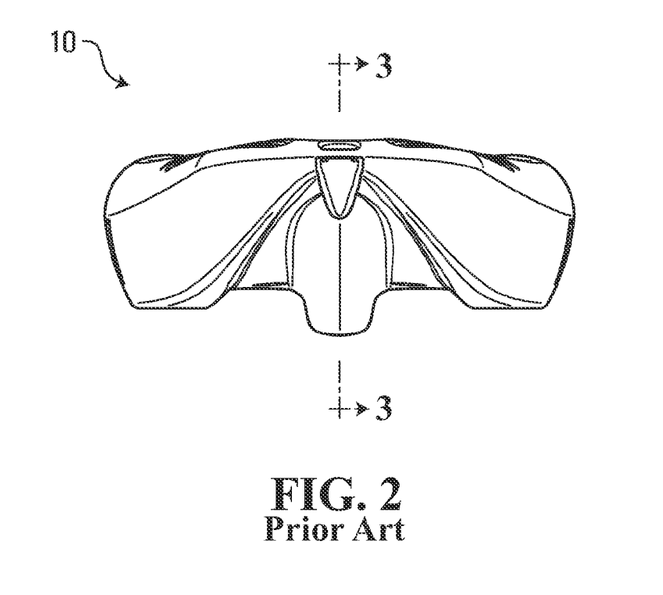
FIG. 2 is a front elevational view of the watercraft of FIG. 1.
Figure 3:
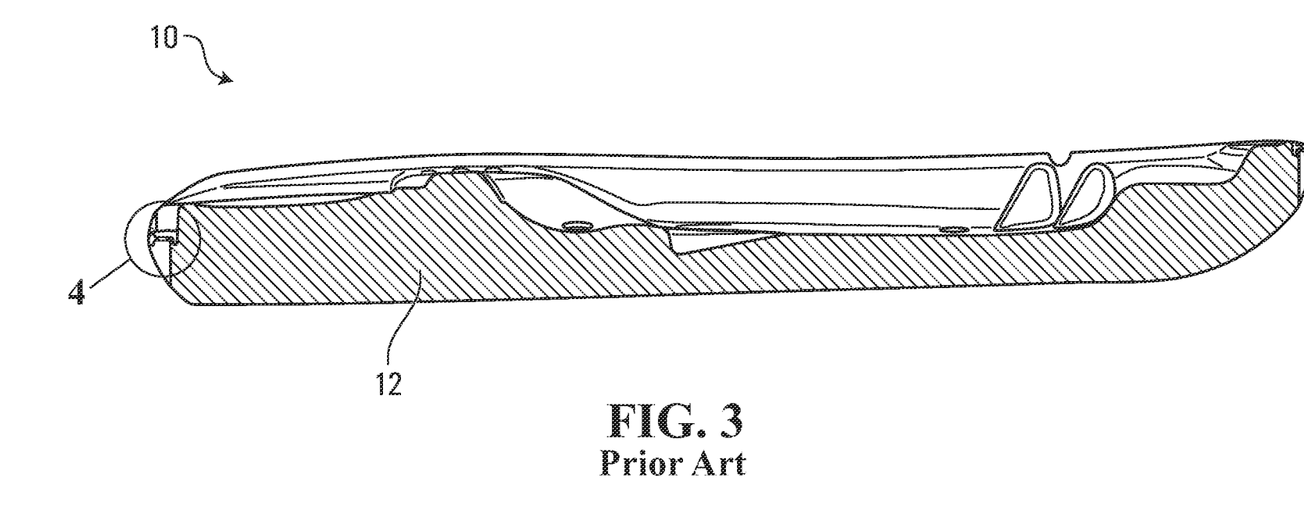
FIG. 3 is a cross-sectional view taken along the axis 3-3.
Figure 4:
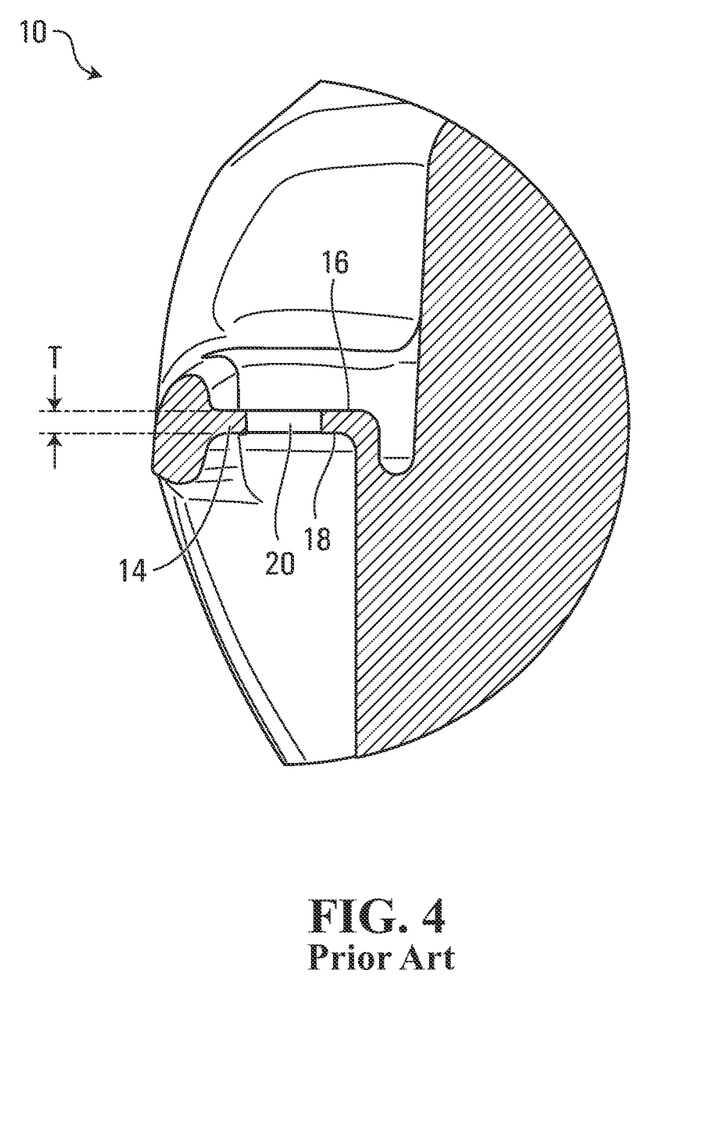
FIG. 4 is an enlarged cross-sectional view taken in FIG. 3.
Figure 5:
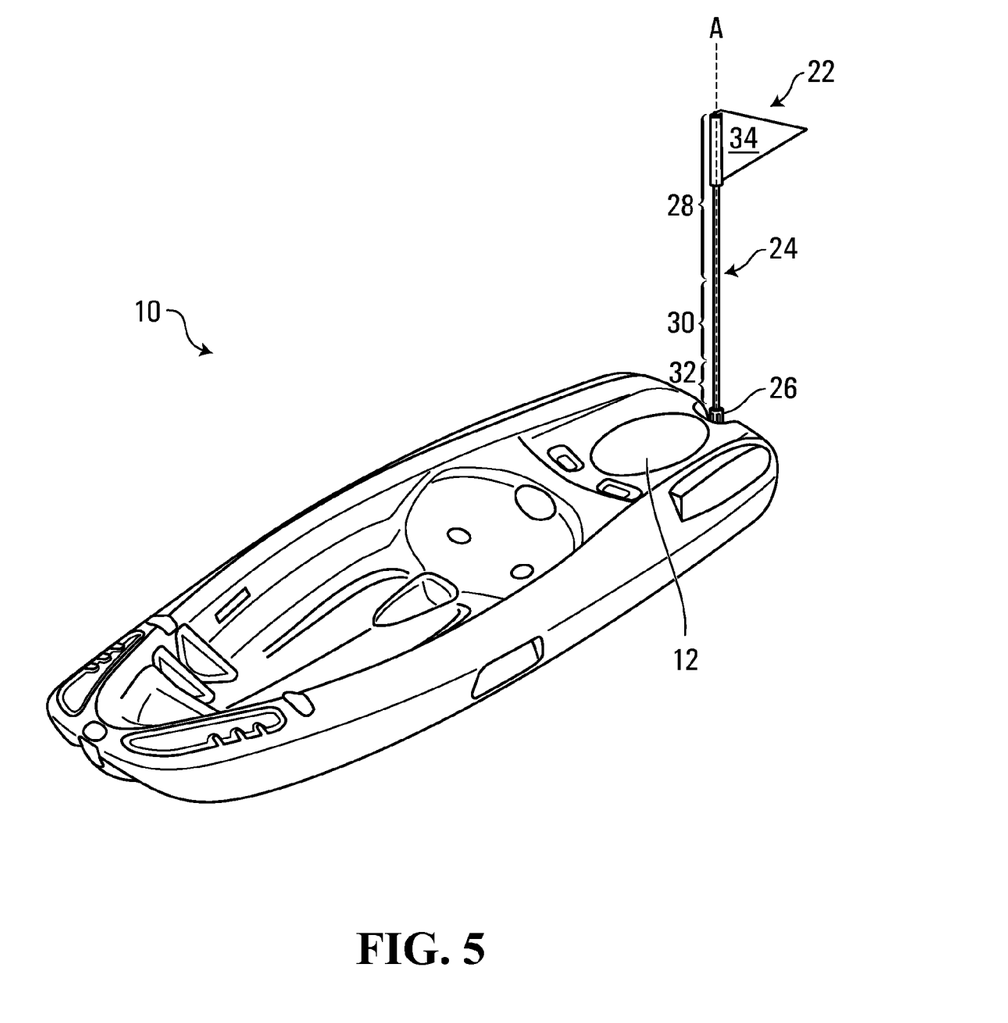
FIG. 5 is a perspective view of the watercraft comprising a safety flag according to one embodiment of the invention.
Figure 6:
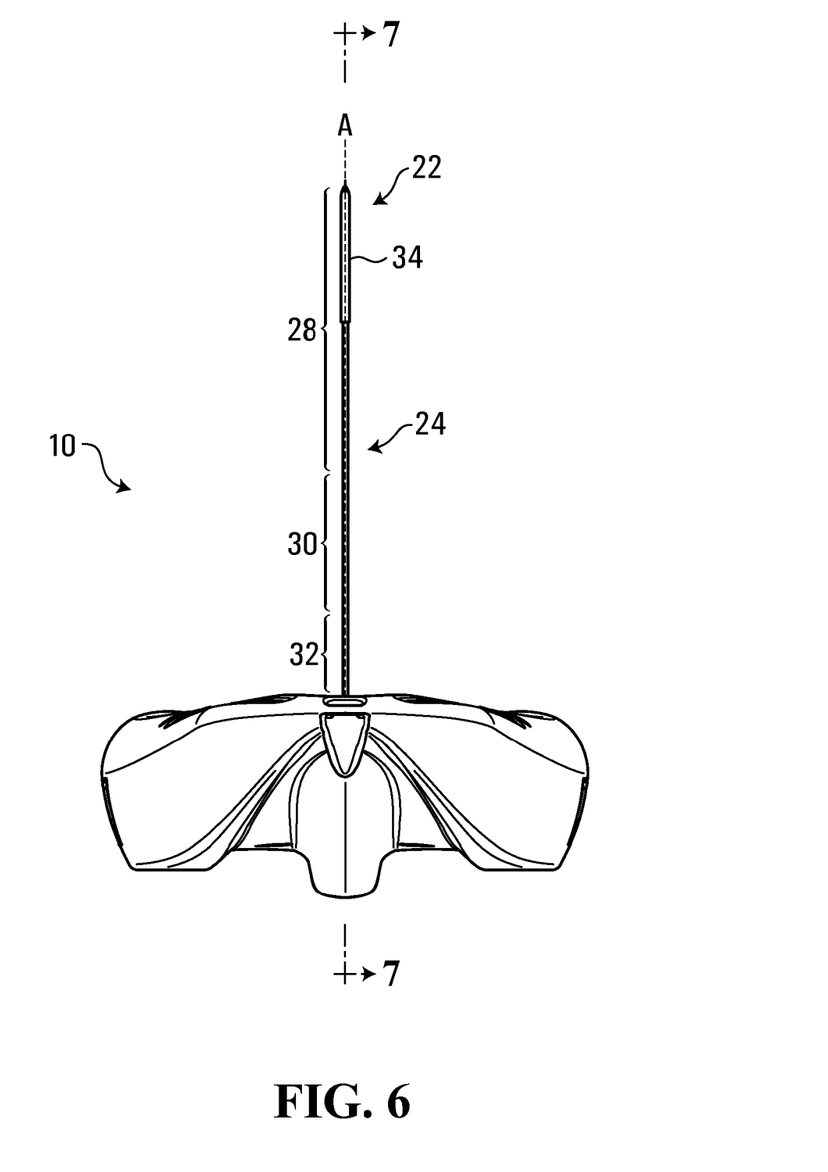
FIG. 6 is a front elevational view of the watercraft and safety flag of FIG. 5.
Figure 7:
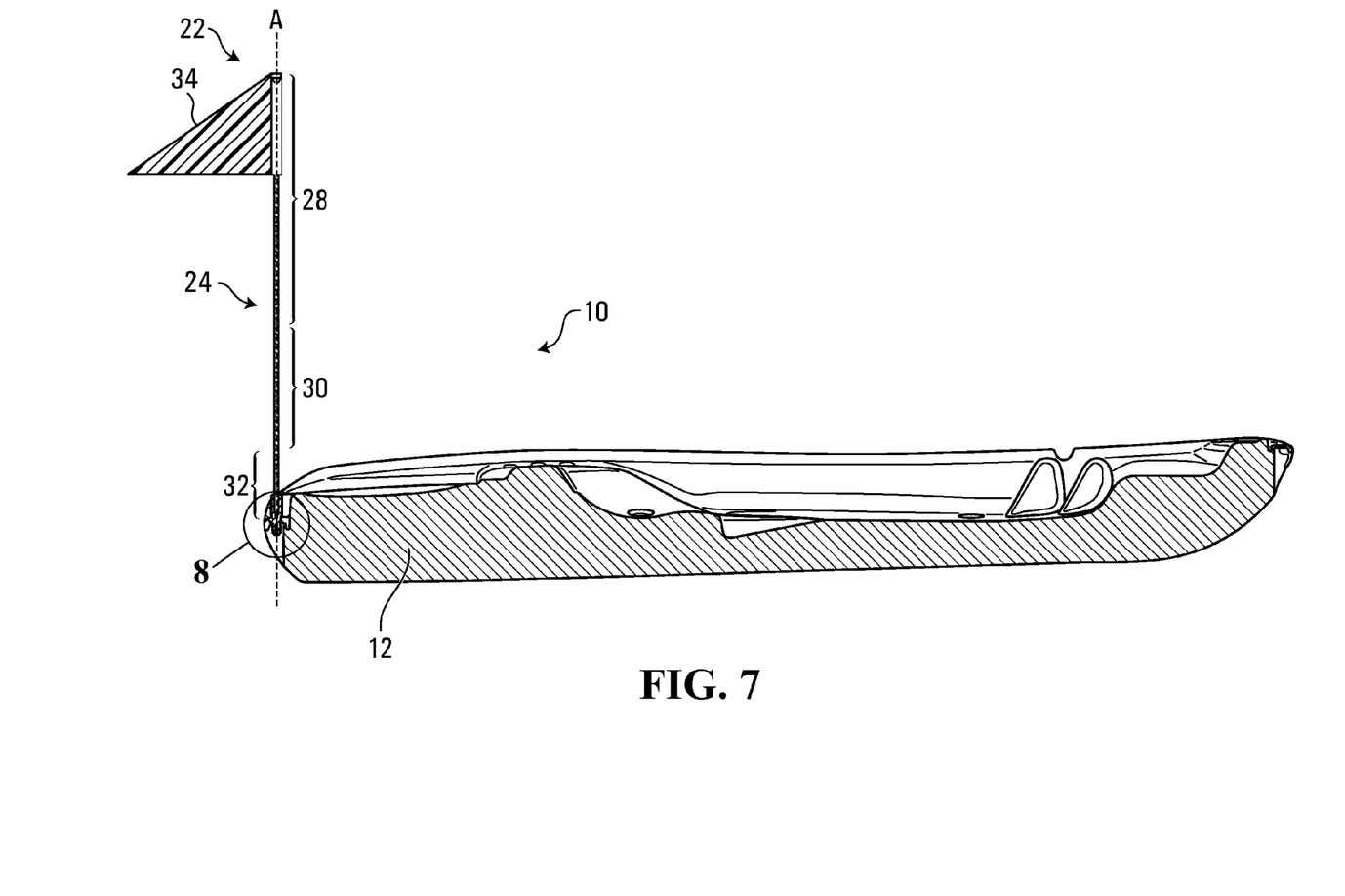
FIG. 7 is a cross-sectional view taken along the axis 7-7.
Figure 8:
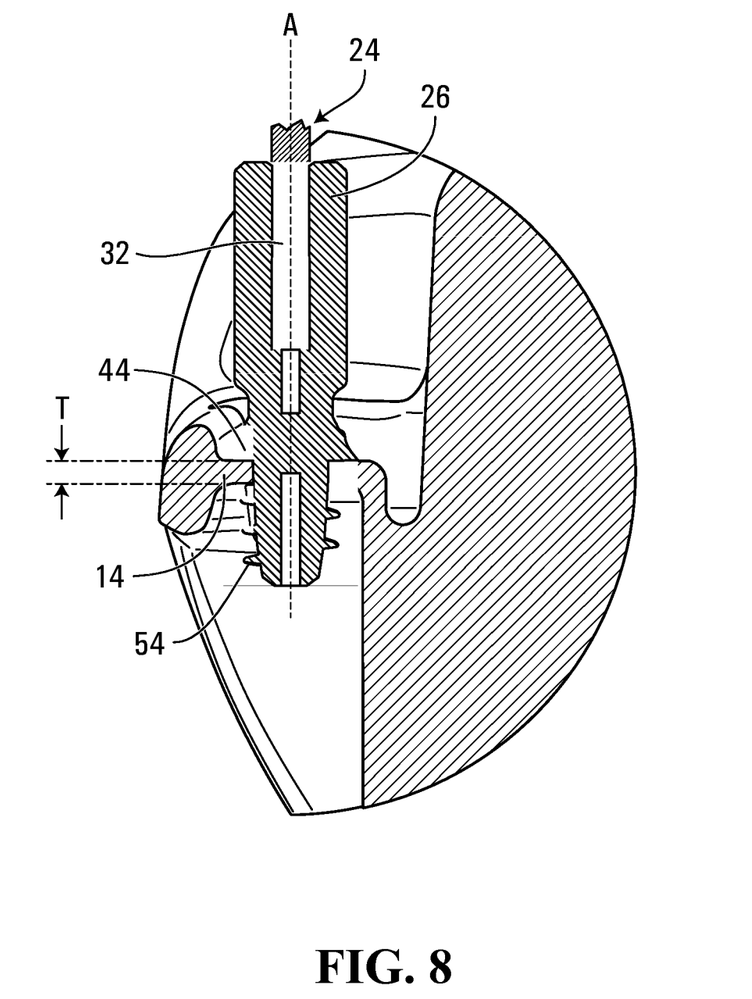
FIG. 8 is an enlarged cross-sectional view taken in FIG. 7.
Figure 9:
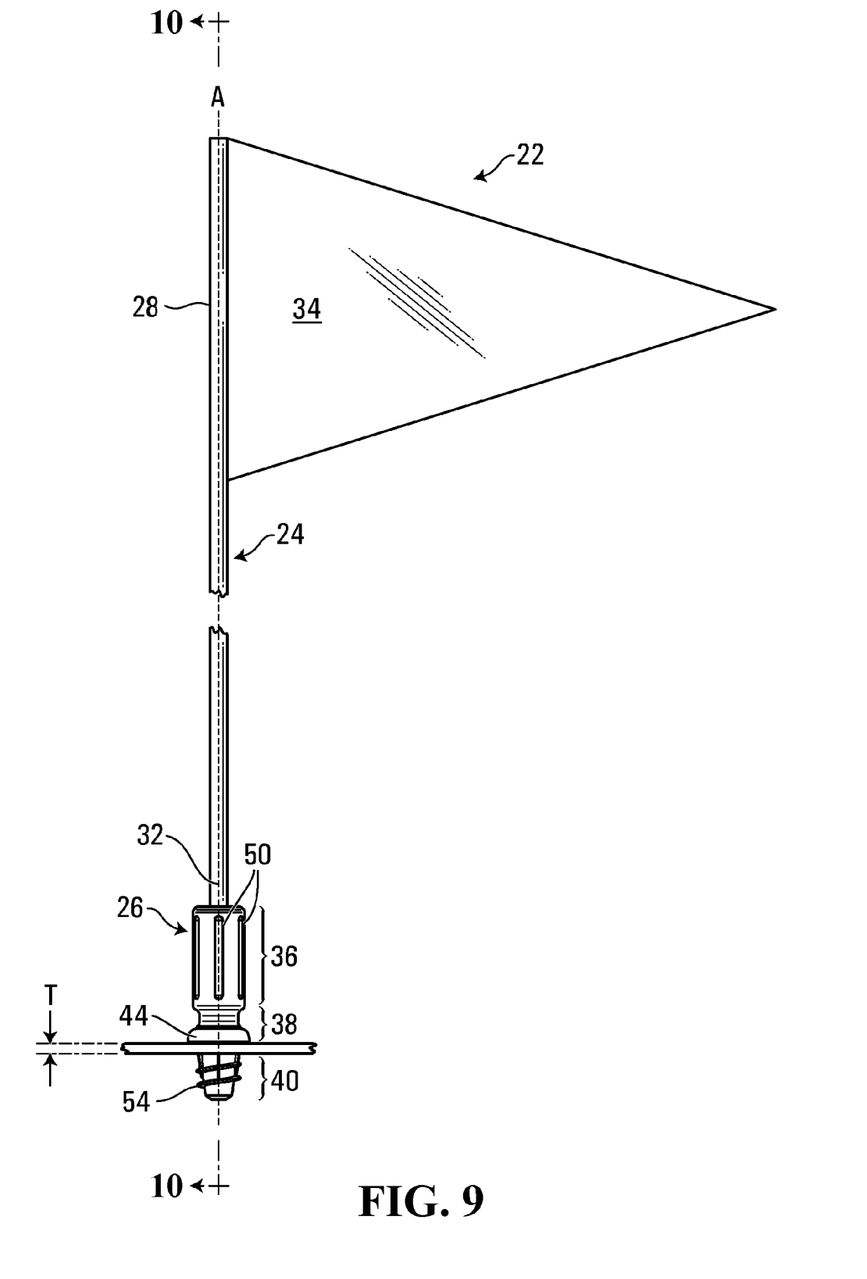
FIG. 9 is an enlarged side elevational view of the flag.
Figure 10:
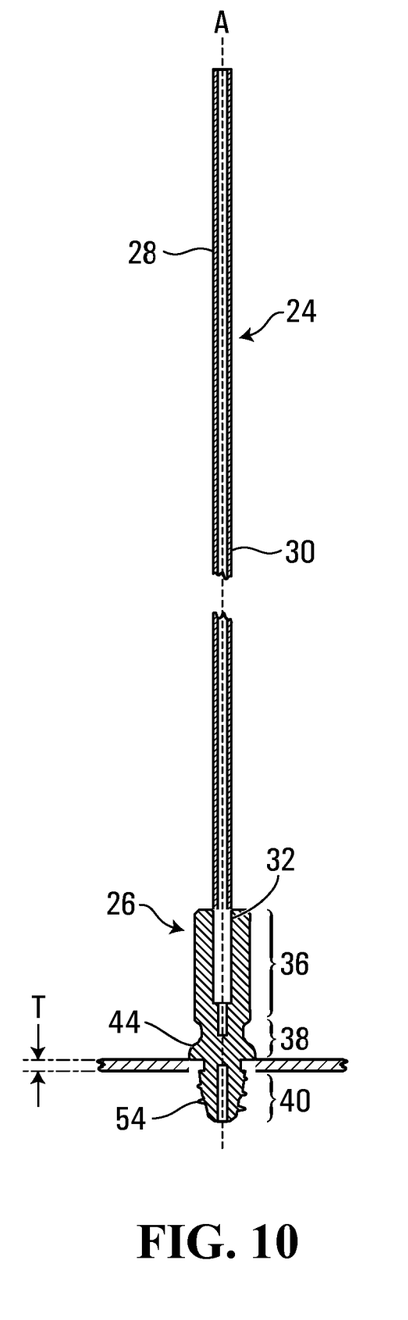
FIG. 10 is a cross-sectional view taken along the axis 10-10.

FIGS. 1 to 4 show a watercraft 10 (e.g. kayak) having a rear portion 12 with an upper horizontal wall 14. As best seen in FIG. 4, the wall 14 has upper and bottom surfaces 16, 18 and a rear aperture 20 defined in the wall 14. The aperture 20 is meant to receive a safety flag 22. It is understood that the wall 14 and its corresponding aperture 20 may be located in a different portion of the watercraft. For example, in one embodiment, the wall 14 and the aperture 20 can be located at the front portion of the watercraft 10.

As best seen in FIGS. 5 to 8, the safety flag 22 extends along a longitudinal axis A and comprises an elongated pole 24, a pennant flag 34 and a connector 26. The elongated pole 24 and connector 26 both also extend along the longitudinal axis A.

The elongated pole 24 has an upper portion 28, an intermediate portion 30 and a bottom portion 32. The pole 24 may be made of a rigid material. For example, in some embodiments, the pole may be made of plastic, fiberglass, aluminum, fiberglass, polyethylene (PE), polypropylene (PP), polyethylene terephthalate (PET), high density polyethylene (HDPE) or Low Density Polyethylene (LDPE) where the material is chosen based on the requested rigidity or flexibility of the elongated pole 24. The dimensions of the elongated pole 24 can also vary depending on the application, the watercraft 10 or the request of the user. In one embodiment, the length of the elongated pole 24 can be between 25 inches and 40 inches.

Depending on the method of manufacture, the elongated pole 24 may vary in diameter. For example, in one embodiment, the diameter can be 0.25 inches where as if the elongated pole is requested to have more rigidity, the diameter can be 0.35 inches. In addition, the elongated pole 24 may be at least partially hollow. For example, the bottom portion 32 of the elongated pole 24 may comprise a longitudinal aperture (not shown) to provide a more secure attachment means with the connector 26. In another embodiment, the longitudinal aperture at the bottom portion 32 of the elongated pole 24 may be threaded.

The pennant flag 34 is mounted to the upper portion 28 of the elongated pole 24. In one embodiment, the pennant flag 34 can comprise a longitudinal pocket which extends along the longitudinal axis A such that the pocket overlaps the upper portion 28 of the pole 24. The pennant flag 34 can also be held in place via an additional attachment means. For example, in one embodiment, the flag can be held in place with the use of a plastic clip. The material of the pennant flag 34 can also vary with respect to desired visibility, wear resistance or aesthetic appeal. For example, in some embodiments, the pennant flag 34 can be made of tarpaulin, polyester, nylon, polyvinyl chloride (PVC) or paper. The shape of the pennant flag 34 can also vary depending on the application. In the embodiment shown, the pennant flag 34 has a triangular shape.

As best seen in FIGS. 9 to 12, the connector 26 has an upper portion 36, an intermediate portion 38 and a bottom portion 40.

The upper portion 36 has an aperture 42 extending along the longitudinal axis A for receiving the bottom portion 32 of the elongated pole 24. As such, the inner diameter of the aperture 42 is chosen as to provide a firm fit with the bottom portion 32 of the elongated pole 24. For example, in one embodiment, the elongated pole 24 may have an outer diameter of 0.3 inches. In such an embodiment, the inner diameter of the aperture 42 may be slightly smaller than 0.3 inches. In addition, the security of the fit between the bottom portion 32 of the elongated pole 24 and the connector 26 could be adjusted via the length of the aperture 42 in the upper portion 36 of the connector 26. For example, in one embodiment, the length of the aperture 42 can be of 1 inch. If a more secure fit is desired, in another embodiment of the invention, the length of the aperture may be at least 2 inches. The upper portion 36 of the connector 26 may also comprise at least one longitudinal grip member 50 extending outwardly or inwardly thereof. The longitudinal grip members 50 aid the user in grasping the connecter 26 when it is being affixed into the aperture 20 of the wall 14 or for turning and/or pressing the connector 26 when this connector is inserted in the aperture 20 up to a position wherein the safety flag 22 is maintained in a stand up position.

The geometry of the connector 26 can also vary based on the requested lengths of the upper portion 36, the intermediate portion 38 and the bottom portion 40. In one embodiment, the connector 26 can designed as to define a total length of 2 inches. In another embodiment, the connector 26 can be designed as to define a total length of up to 5 inches.

The bottom portion 40 of the connector 26 is at least partially made of an elastomeric material such as for example thermoplastic polyurethane (TPU), rubber, styrene-butadiene rubber (SBR) or silicone rubber. In one embodiment of the invention, the bottom portion 40 is at least partially made thermoplastic polyurethane (TPU) having a hardness ranging from 80 Shore A to 100 Shore A. It is understood that the bottom portion 40 may be entirely made of a flexible elastomeric material.

The intermediate portion 38 has a shoulder 44 adapted to abut against the upper surface 16 of the wall 14.

Because the bottom portion 40 of the connector 26 is at least partially be made of an elastomeric material such as for example thermoplastic polyurethane (TPU), rubber, styrene-butadiene rubber (SBR) or silicone rubber, in order to mount the connector 26 to the watercraft 10, the user inserts the bottom portion 40 in the aperture 20 by pressing or rotating the connector 26 and insertion of the bottom portion 40 in the aperture 20 is allowed due to the material deformation of the bottom portion. It is understood that the overall outside diameter of the bottom portion 40 can be slightly greater that the diameter of the aperture 20 in order to allow such material deformation. The user can therefore insert the connector 26 up to a position wherein the shoulder 44 abuts the upper surface 16 of the wall 14 and the safety flag 22 is maintained in a stand up position.

In one embodiment, the shoulder 44 can be designed (molded) such that it mates with a portion of the upper surface 16 of the wall 14 when the connector 26 is inserted into the aperture 20 of the wall 14. The geometry of the shoulder 44 of the connector 26 can vary depending on the requested contact surface. For example, the outermost diameter D of the shoulder 44 can range from 0.8 inches to 1.5 inches. In addition, the thickness S of the shoulder 44 can also vary between 0.2 inches to 0.5 inches depending on the rigidity of the material.

The shoulder 44 of the connector 26 may be at least partially made of an elastomeric material such as for example thermoplastic polyurethane (TPU), rubber, styrene-butadiene rubber (SBR) or silicone rubber. In one embodiment of the invention, the shoulder 44 is at least partially made thermoplastic polyurethane (TPU) having a hardness ranging from 80 Shore A to 100 Shore A. It is understood that the bottom shoulder 44 may be entirely made of a flexible elastomeric material.

The shoulder 44 and the longitudinal members 52 add further stability to the connector 26 by creating abutting contacts between the bottom surface of the shoulder 44 and the upper surface 16 of the wall 14 and between each upper end of the longitudinal members 52 and the bottom surface 18 of the wall 14.

Figure 11:
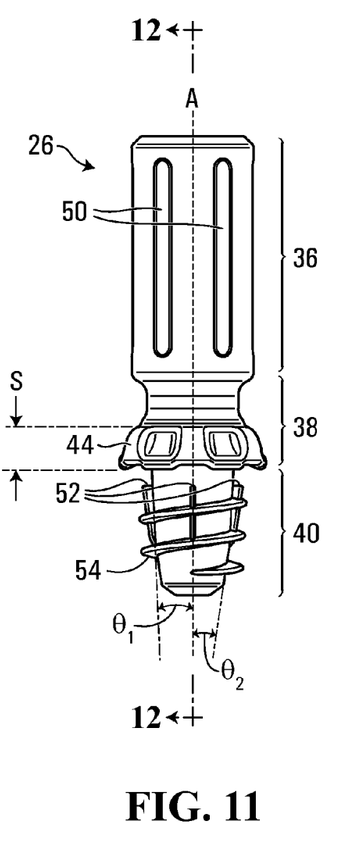
FIG. 11 is an enlarged side view of a connector of the flag.
Figure 12:
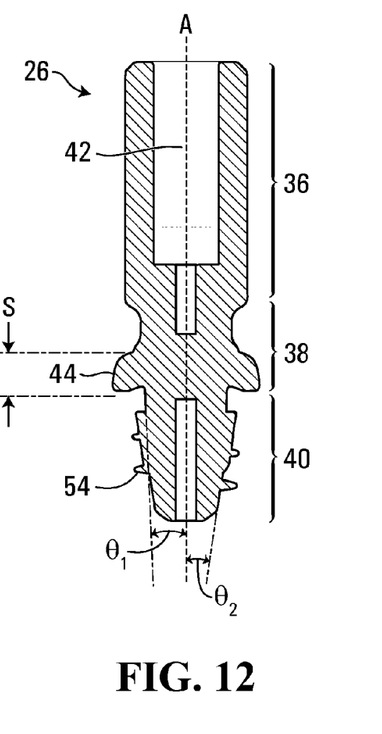
FIG. 12 is a cross-sectional view taken along the axis 12-12.
Figure 13:
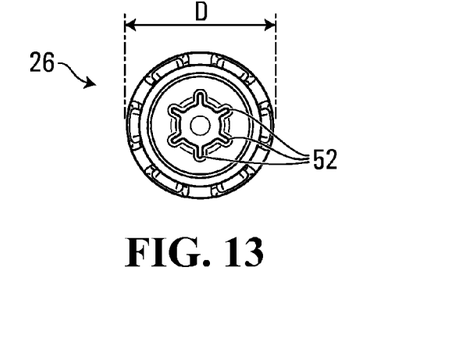
FIG. 13 is a bottom view of the support.

As best seen in FIG. 11, the bottom portion 40 has a conical portion with a thread projecting outwardly thereof. The conical portion may comprise at least one longitudinal member 52 projecting outwardly thereof and the thread may be an elliptical thread 54 with a pitch between 0.1 inches and 0.4 inches.

It is to be noted that the distance between the bottom surface of the shoulder 44 and each upper end of the longitudinal members 52 extending from the bottom portion 40 of the connector 26 may be determined such that the watercraft wall 14, which has a thickness T, will fit snugly therein. For example, in one embodiment, the distance between the bottom surface of the shoulder 44 and the upper end of the longitudinal members 52 may range from 0.1 inches to 0.5 inches in order to receive the watercraft wall 14.

The conical portion may have a uniform tapering angle throughout. In another embodiment of the present invention, the conical portion may have a first tapering angle $\theta_1$ and as second tapering angle $\theta_2$. The change between the first tapering angle $\theta_1$ and the second tapering angle $\theta_2$ may occur at any point above or below the threaded portion of the conical shape or within the threaded portion of the conical shape. For example, in one embodiment, the first tapering angle $\theta_1$ can be between 3° and 20° and the tapering angle of the conical shape can then change in the middle of the conical portion to a second tapering angle $\theta_2$ between 3° and 30°. In another embodiment of the present invention, the tapering angle can further change to a third tapering angle $\theta_3$ (not shown) at a lower end of the conical portion. In some embodiments, the tapering angle can be adjusted such that the conical portion converges at one point. Alternatively, the conical portion could be truncated. In the case where the conical portion is truncated, the bottom portion of the conical portion may comprise a tapered end. In one embodiment, the conical portion may have a diameter between 0.4 and 0.8 inches and may be truncated to a total height between 0.6 inches and 1 inch.

In one embodiment, the longitudinal members 52 and/or the elliptical thread 54 of the connector 26 is at least partially made of an elastomeric material such as for example thermoplastic polyurethane (TPU), rubber, styrene-butadiene rubber (SBR) or silicone rubber. In one embodiment of the invention, the bottom portion 40 is at least partially made thermoplastic polyurethane (TPU) having a hardness ranging from 80 Shore A to 100 Shore A. It is understood that the longitudinal members 52 and/or the elliptical thread 54 may be entirely made of a flexible elastomeric material.

It is further understood that the connector 26 may be entirely made of a flexible elastomeric material.

Because the longitudinal members 52 and/or the elliptical thread 54 of the connector 26 is at least partially be made of an elastomeric material such as for example thermoplastic polyurethane (TPU), rubber, styrene-butadiene rubber (SBR) or silicone rubber, in order to mount the connector 26 to the watercraft 10, the user inserts the bottom portion 40 in the aperture 20 by pressing or rotating the connector 26 and insertion of the bottom portion 40 in the aperture 20 is allowed due to the material deformation of the longitudinal members 52 and/or the elliptical thread 54. It is understood that the overall outside diameter of the longitudinal members 52 and/or the elliptical thread 54 can be slightly greater that the diameter of the aperture 20 in order to allow such material deformation. The user can therefore insert the connector 26 up to a position wherein the shoulder 44 abuts the upper surface 16 of the wall 14 and the safety flag 22 is maintained in a stand up position.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A safety flag for a watercraft having a portion with a wall having upper and bottom surfaces and an aperture defined in the wall, said safety flag extending along a longitudinal axis and comprising:
    (a) an elongated pole having upper, intermediate and bottom portions extending along said longitudinal axis;
    (b) a pennant flag mounted to said upper portion of said elongated pole; and
    (c) a connector having upper, intermediate and bottom portions extending along said longitudinal axis, said upper portion having an aperture extending along said longitudinal axis for receiving said bottom portion of said pole, said intermediate portion having a shoulder for abutting against the upper surface of the wall and wherein said bottom portion has a conical shape and is at least partially made of a flexible elastomeric material such that, in use, a user can insert said bottom portion in the aperture of the wall by rotating or pressing said connector up to a position wherein said shoulder abuts the upper surface of the wall and said safety flag is maintained in a stand up position.

2. A safety flag for a watercraft as defined in claim 1, wherein said shoulder is at least partially made of said flexible material.

3. A safety flag for a watercraft as defined in claim 1, wherein said bottom portion of said connector defines a conical portion and further comprises a thread extending outwardly thereof.

4. A safety flag for a watercraft as defined in claim 3, wherein said thread is an elliptical thread.

5. A safety flag for a watercraft as defined in claim 4, wherein said thread has a pitch between 0.1 inches and 0.4 inches.

6. A safety flag for a watercraft as defined in claim 3, wherein said conical portion has a tapering angle between 3° and 20°.

7. A safety flag for a watercraft as defined in claim 6, wherein said conical portion of said connector defines an additional tapering angle above an uppermost portion of said thread, said additional tapering angle being between 3° and 30°.

8. A safety flag for a watercraft as defined in claim 6, wherein said conical portion of said connector defines an additional tapering angle between an uppermost portion and a lowermost portion of said thread, said additional tapering angle being between 3° and 30°.

9. A safety flag for a watercraft as defined in claim 6, wherein said conical portion of said connector defines an additional tapering angle below a lowermost portion of said thread, said additional tapering angle being between 3° and 30°.

10. A safety flag for a watercraft as defined in claim 3, wherein said conical portion of said connector has a height between 0.5 inches and 2 inches.

11. A safety flag for a watercraft as defined in claim 1, wherein said upper portion of said connector has at least one longitudinal grip member extending either outwardly or inwardly thereof.

12. A safety flag for a watercraft as defined in claim 1, wherein said upper portion of said connector has at least three longitudinal grip members extending either outwardly or inwardly thereof.

13. A safety flag for a watercraft as defined in claim 1, wherein said shoulder has a diameter between 0.8 inches and 1.5 inches.

14. A safety flag for a watercraft as defined in claim 1, wherein said shoulder has a thickness between 0.2 inches and 0.5 inches.

15. A safety flag for a watercraft as defined in claim 1, wherein said bottom portion of said connector further comprises at least one longitudinal member extending outwardly thereof.

16. A safety flag for a watercraft as defined in claim 15, wherein a distance between a lowermost portion of said shoulder and an uppermost portion of said at least one longitudinal member is between 0.1 inches and 0.5 inches.

17. A safety flag for a watercraft as defined in claim 1, wherein said bottom portion of said connector further comprises at least three separate longitudinal members projecting outwardly thereof.

18. A safety flag for a watercraft as defined in claim 1, wherein said bottom portion of said connector has an overall diameter that is greater than a diameter of the aperture of the wall.

19. A safety flag for a watercraft as defined in claim 1, wherein said flexible elastomeric material is selected in a group consisting of thermoplastic polyurethane (TPU), rubber, styrene-butadiene rubber (SBR) and silicone rubber.

20. A safety flag for a watercraft as defined in claim 19, wherein said elastomeric material has a hardness ranging from 80 Shore A to 100 Shore A.

21. A safety flag for a watercraft as defined in claim 1, wherein said shoulder and bottom portion of said connector are entirely made of said flexible elastomeric material.

22. A safety flag for a watercraft as defined in claim 21, wherein said flexible elastomeric material is selected in a group consisting of thermoplastic polyurethane (TPU), rubber, styrene-butadiene rubber (SBR) and silicone rubber.

23. A safety flag for a watercraft as defined in claim 22, wherein said elastomeric material has a hardness ranging from 80 Shore A to 100 Shore A.

24. A safety flag for a watercraft as defined in claim 1, wherein said connector is entirely made of said flexible elastomeric material.

25. A safety flag for a watercraft as defined in claim 24, wherein said flexible elastomeric material is selected in a group consisting of thermoplastic polyurethane (TPU), rubber, styrene-butadiene rubber (SBR) and silicone rubber.

26. A watercraft assembly comprising:
 (a) a watercraft having a portion with a wall having upper and bottom surfaces and an aperture defined in the wall;
 (b) a safety flag comprising:
  i) an elongated pole having upper, intermediate and bottom portions extending along a longitudinal axis;
  ii) a pennant flag mounted to said upper portion of said elongated pole; and
  iii) a connector having upper, intermediate and bottom portions extending along said longitudinal axis, said upper portion having an aperture extending along said longitudinal axis for receiving said bottom portion of said pole, said intermediate portion having a shoulder for abutting against the upper surface of the wall of the watercraft and wherein said bottom portion has a conical shape and is at least partially made of a flexible elastomeric material;
 wherein, in use, the watercraft and the safety flag are assembled, the bottom portion of the connector of the safety flag engages the aperture defined in the wall of the watercraft by rotating or pressing said connector up to a position wherein the shoulder of the intermediate portion of the connector abuts the upper surface of the wall of the watercraft and said safety flag is maintained in a stand up position, the longitudinal axis being oriented generally transversally to said portion of the watercraft.

27. A watercraft assembly as defined in claim 26, wherein the portion of the watercraft with the wall in which the aperture is defined is a rear portion of the watercraft.

28. A watercraft assembly as defined in claim 26, wherein the portion of the watercraft with the wall in which the aperture is defined is a front portion of the watercraft.

29. A watercraft assembly as defined in claim 26, wherein the watercraft is a kayak.

* * * * *